US008285795B2

(12) United States Patent
O'Sullivan et al.

(10) Patent No.: US 8,285,795 B2
(45) Date of Patent: Oct. 9, 2012

(54) MANAGING URGENCY INDICATORS IN ELECTRONIC MESSAGING

(75) Inventors: Patrick J. O'Sullivan, Ballsbridge (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/199,552

(22) Filed: Aug. 27, 2008

(65) Prior Publication Data

US 2010/0057856 A1 Mar. 4, 2010

(51) Int. Cl.
*G06F 15/16* (2006.01)
(52) U.S. Cl. . 709/206; 709/207; 709/224; 707/999.005; 707/999.009

(58) Field of Classification Search .................. 709/206, 709/207, 224
See application file for complete search history.

(56) References Cited

U.S. PATENT DOCUMENTS

| 6,591,265 B1* | 7/2003 | Erickson et al. ........................ 1/1 |
| 2006/0010217 A1* | 1/2006 | Sood ............................. 709/206 |
| 2006/0031373 A1* | 2/2006 | Werner et al. ................. 709/207 |
| 2006/0059238 A1* | 3/2006 | Slater et al. .................... 709/206 |

* cited by examiner

*Primary Examiner* — Kyung H Shin
(74) *Attorney, Agent, or Firm* — Steven M. Greenberg, Esq.; Carey, Rodriguez, Greenberg & O'Keefe

(57) ABSTRACT

A rating is applied in connection with a sender of an electronic message and a use of an urgency indicator for the electronic message. A different electronic message is received from the sender, and an urgency indicator established for the different electronic message is modified responsive to the applied rating.

11 Claims, 3 Drawing Sheets

MANAGING URGENCY INDICATORS IN ELECTRONIC MESSAGING

BACKGROUND OF THE INVENTION

The invention disclosed broadly relates to the field of electronic messaging and more particularly relates to the field of managing urgency indicators for electronic messaging.

The emergence of electronic messaging (email, voicemail, text messaging, instant messages and fax) has changed the face of modern communication. Today, millions of people every day use electronic messages to communicate instantaneously across the world and over international and cultural boundaries. It is estimated that over two thirds of the population of the United States utilizes electronic messaging.

One of the features of electronic messaging is an urgency or importance indicator. When an electronic message, such as an email, is created, the sender of the message can define an urgency or importance indicator that signifies the level of urgency or the level of importance associated with a message. The default indicator for a message is usually an indicator that signifies "regular importance" or "no urgency." Typically, the sender of a message must actively make a selection that increases the urgency or importance of the message.

A message designated as "urgent" or "highly important" is reserved for a message having subject matter that is truly important or urgent, such as matters involving substantial amounts of money, time criticality or matters of life or death. Some users of electronic messaging, however, are unscrupulous in their use of the urgency or importance indicator and often mark messages as "urgent" or "highly important" when it is inappropriate. This can be disconcerting to the receiver of the electronic message who may rush to open and read a message that is clearly not urgent or important.

BRIEF SUMMARY OF THE INVENTION

In one embodiment of the invention, a method for managing urgency indicators in electronic messages is disclosed. The method can include establishing a rating in connection with a sender of an electronic message and a use of an urgency indicator for the electronic message, receiving a different electronic message from the sender, and modifying an urgency indicator established for the different electronic message responsive to the established rating. In one aspect of the embodiment, the method also can include forming a composite rating from multiple different ratings in connection with the sender of respectively different electronic messages and a corresponding use of an urgency indicator for each of the different electronic messages, receiving a further electronic message from the sender, and modifying an urgency indicator established for the further electronic message responsive to the composite rating.

In another embodiment of the invention, a data processing system can be configured to manage urgency indicators in electronic messages. The system can include a database storing ratings. Each rating can correspond to a different sender of an electronic message with a corresponding urgency indicator. The system also can include a computer including program logic executing thereon. The program logic can include program code enabled to modify an urgency indicator established for a received electronic message responsive to a rating stored in the database in association with a sender of the received electronic message. In one aspect of the embodiment, at least one of the ratings can be a composite of ratings applied to a corresponding sender in connection with different urgency indicators assigned by the corresponding sender to different electronic messages. In another aspect of the embodiment, the database further can store judgment values, each of the judgment values representing a historical veracity of urgency indicators previously applied to electronic messages by corresponding senders It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Figure 1:
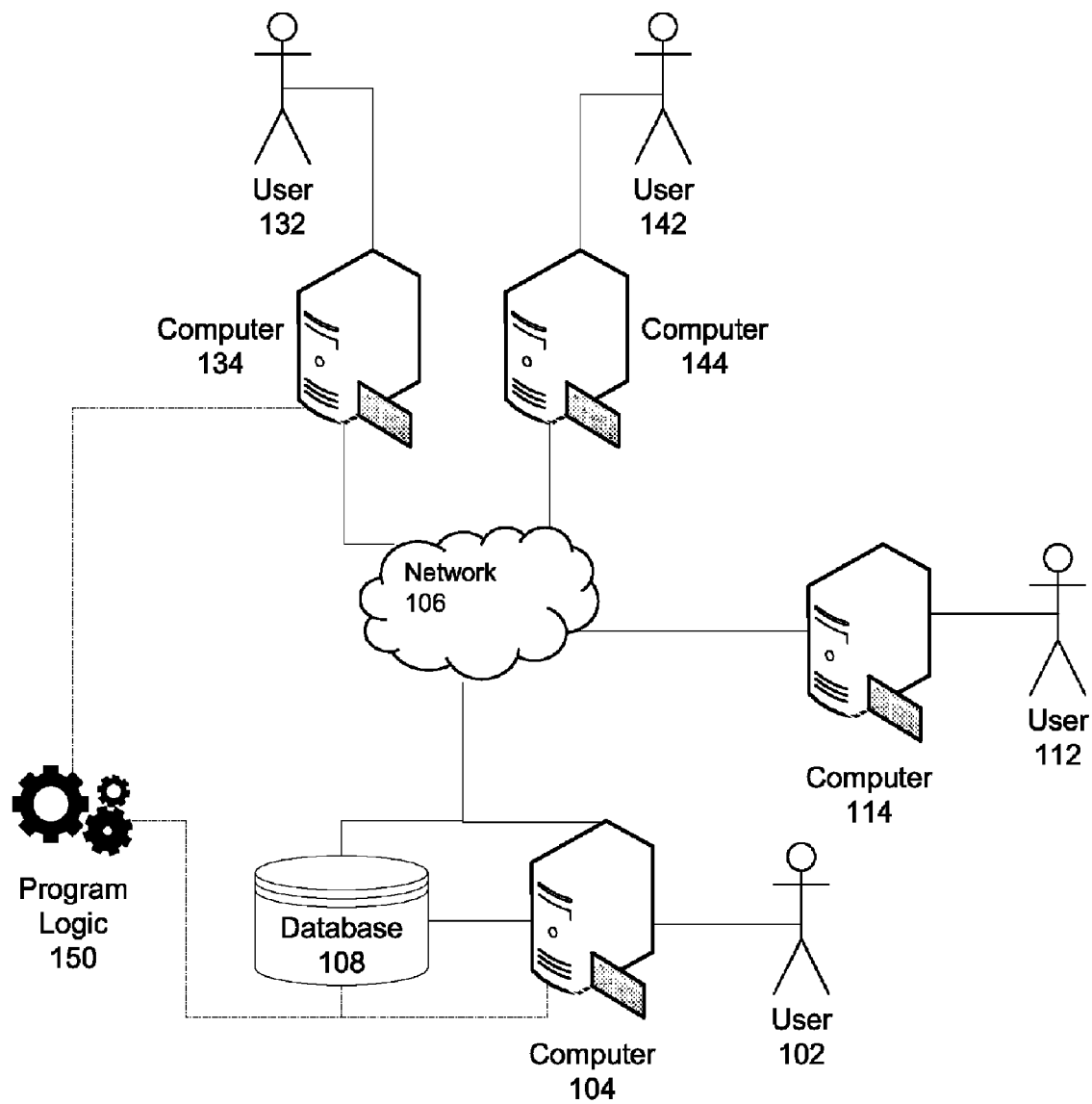
FIG. 1 is block diagram showing a high-level network architecture of a system for managing urgency indicators of electronic messages, according to an embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is block diagram showing a high-level network architecture of a system for managing urgency indicators of electronic messages, according to an embodiment of the present invention. FIG. 1 shows a computer 104 connected to a network 106. The computer 104 may be an electronic message server, such as an email server providing email services to multiple users over a local area network (LAN), or a single personal computer providing an electronic message application, (e.g., an email client application) for a single user 102, a recipient of electronic messages.

FIG. 1 also shows a computer 114 connected to a network 106, wherein the computer 114 provides electronic messaging capability to a single user 112, a sender of electronic messages. FIG. 1 further shows computer 134 and computer 144, both connected to a network 106, wherein each computer 134, 144 provides electronic messaging capability to a single user 132, 142 respectively, both recipients of electronic messages.

The computer 104 further includes program logic 150, which provides program code enabled to manage urgency indicators in electronic messages, as described in greater detail below. Specifically, program logic 150 can include computer source code, object code, scripting language code or interpreted language code that contains computer instructions that perform various functions of the present invention. Program logic 150 can be implemented as hardware, software or any combination of the two. In one embodiment of the present invention, program logic 150 may reside on computer 134 or database 108. In another embodiment of the present invention, program logic 150 may reside in a distributed fashion on any combination of computer 104, database 108, computers 114, 134, 144 and any other computer providing server or client email services.

Connected to computer 104 is a data store 108 for storing information used during the urgency indicator management process, such as the identities of senders of electronic messages, ratings given to senders by recipients based on the judgment of senders in using urgency indicators in electronic messages, judgment scores or values for individuals based on the ratings and/or similar information. The data store 108 may be a table, a flat file, or any commercially available database such as the IBM® DB2® database (IBM and DB2 are registered trademarks of International Business Machines in the United State, other countries or both). Data store 108 may alternatively be a separate, autonomous entity connected to network 106.

In one alternative aspect of the embodiment, a database may be local to each of the e-mail clients 104, 114, 134, 144. In yet another alternative, a database may be distributed among computers 104, 114, 134, 144 and any other computer providing server or client email services. In yet another alternative, stored data may be stored locally on respective computers 104, 114, 134, 144.

Email sender 112 may use computer 114 to send an electronic message, such as an email message, over a network such as network 106. The path of an email in FIG. 1 begins, for example, at computer 114, travels through the network 106 and is received by computer 104, where it is optionally processed according to the present invention by the program logic 150. This process is described in greater detail with reference to the flowchart of FIG. 3.

In an embodiment of the present invention, one or more of the computer systems of the computers 104, 114, 134, 144 and database 108 are Personal Computers (PCs) (e.g., IBM or compatible PC workstations running the Microsoft® Windows® operating system or equivalent), Personal Digital Assistants (PDAs), hand held computers, palm top computers, smart phones, game consoles or any other information processing devices (Microsoft and Windows are registered trademarks of Microsoft Corporation in the US, other countries or both). In another embodiment of the present invention, one or more of the computer systems of the computers 104, 114, 134, 144 and database 108 are a server system (e.g., IBM RS/6000 workstations and servers running the AIX® operating system or SUN® Ultra workstations running the SunOS operating system) (AIX is a registered trademark of International Business Machines in the US, other countries or both; Sun is a registered trademark of Sun Microsystems in the US, other countries or both).

In another embodiment of the present invention, the network 106 is a circuit switched network, such as the Public Service Telephone Network (PSTN). In yet another embodiment, the network 106 is a packet switched network. The packet switched network is a wide area network (WAN), such as the global Internet, a private WAN, a telecommunications network or any combination of the above-mentioned networks. In yet another embodiment, the network 106 is a wired network, a wireless network, a broadcast network or a point-to-point network.

It should be noted that although computer 104 and database 108 are shown as separate entities in FIG. 1, the functions of both entities may be integrated into a single entity. It should also be noted that although FIG. 1 shows only three email recipients 104, 134, 144 and one email sender 114, the present invention can be implemented with any number of email senders and recipients.

Figure 2:
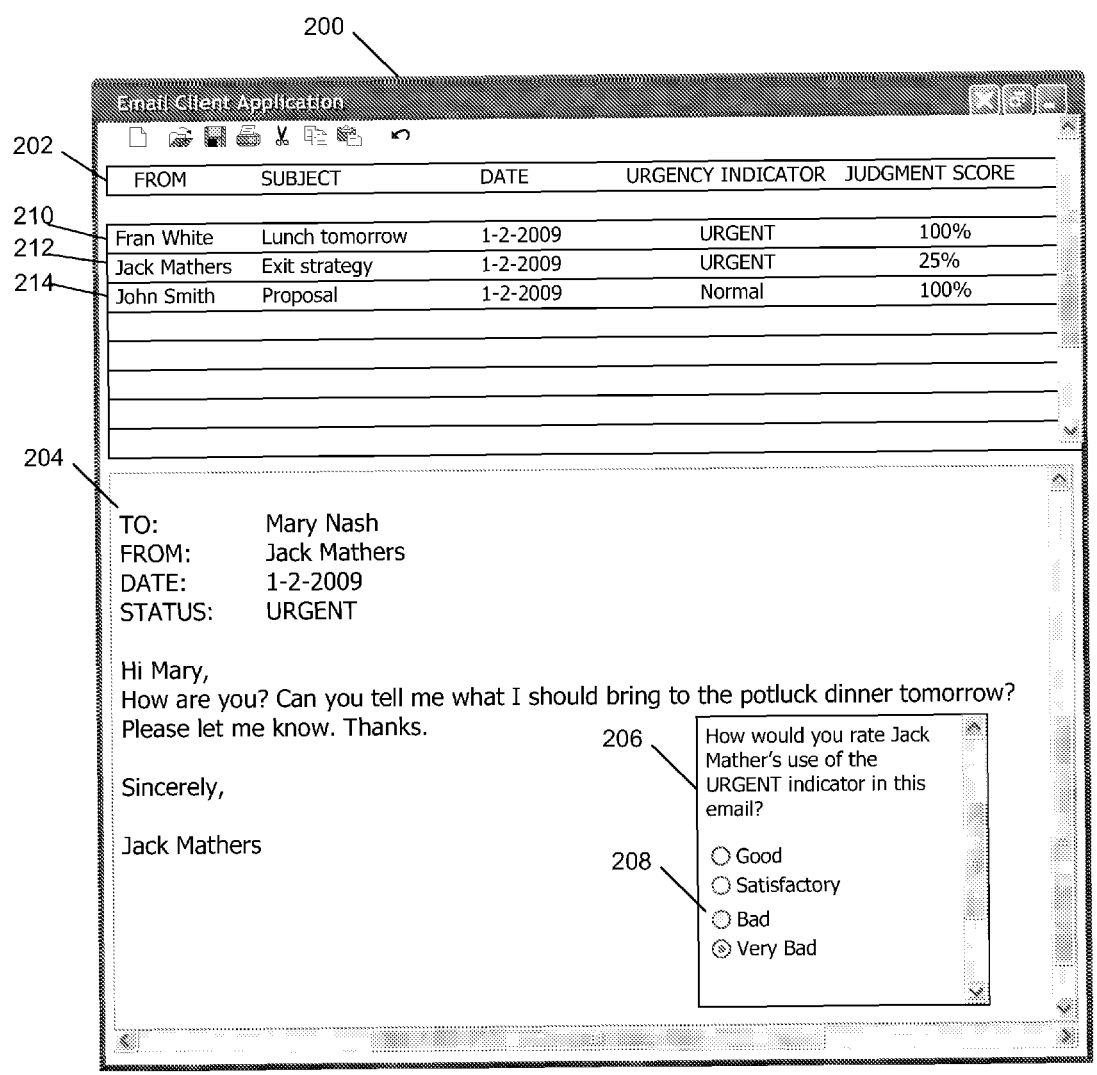
FIG. 2 is an illustration of an email client application including a system for managing urgency indicators of electronic messages, according to an embodiment of the present invention.

Electronic messages include email, voicemail, text messages, instant messages, faxes and any other message that can be sent, received and viewed electronically, such as via computer or mobile phone. For exemplary purposes, FIG. 2 will focus on a system for managing urgency indicators of email electronic messages. FIG. 2 is an illustration of an email client application including a system for managing urgency indicators of electronic messages, according to an embodiment of the present invention. FIG. 2 shows a window 200 for an email client application, whereby email messages are created, sent, received and evaluated.

FIG. 2 shows that within window 200, a list 202 of email messages is presented. In each row of the list 202, basic information for each email message is displayed, such as the identity or name of the sender of the email, the subject of the email, the date the email was received, an urgency indicator if any signifying the urgent status of the email assigned by the sender to the email and a judgment score or value associated with the sender of the email. A judgment score or value is a rating that indicates the historical veracity or authenticity of the urgent status of emails or lack thereof of a sender. The judgment score further can be, a composite rating formed from ratings previously applied to the sender of the email by previously recipients of email sent by the sender each with a corresponding urgency indicator. The ratings may have been provided by: 1) the user of window 200 (i.e., one recipient of the sender's email, such as user 102), 2) other recipients of emails from the same sender (i.e., users 132, 142) or 3) both. This is explained in greater detail below.

Note that although FIG. 2 describes the use of a percentage numerical indicator (i.e., a judgment score or value) to signify the veracity or authenticity of the urgent status of a sender's emails, the present invention supports other methods for signifying the same value, such as the use of words (i.e., "credible," "not credible") and the use of graphic icons or shapes, highlighting, colored text and backgrounds and/or sounds.

FIG. 2 shows that the first email 210 from "Fran White" includes an urgency status indicator of "urgent" and further boasts a judgment score of 100%, thereby signifying that the veracity or authenticity of the urgent status of email 210 is probably highly credible. Seeing this perfect judgment score for email 210, the user of window 200 is secure in knowing that the email 210 from "Fran White" probably involves subject matter of objectively great urgency or importance. The user is therefore making efficient use of his or her time in opening the email 210 immediately.

FIG. 2 further shows that the third email 214 from "John Smith" includes an urgency status indicator of "Normal" and further boasts a judgment score of 100%, thereby signifying that the veracity or authenticity of the urgent status of email 214 is probably highly credible. Seeing this perfect judgment score for email 214, the user of window 200 is secure in knowing that the email 214 from "John Smith" probably involves subject matter of normal or standard urgency or importance. The user is therefore not urged to open the email 214 immediately, and may wait to open and read the email at his convenience.

FIG. 2 further shows that the second email 212 from "Jack Mathers" includes an urgency status indicator of "urgent" and further boasts a judgment score of 25%, thereby signifying that the urgent status of email 212 is probably not warranted. Seeing this low judgment score for email 212, the user of window 200 is secure in knowing that the email 212 from "Jack Mathers" probably does not involve subject matter of objectively great urgency or importance. The user is therefore not urged to open the email 212 immediately, and may wait to open and read the email at his convenience.

FIG. 2 further shows that the email 212, when selected in list 202, can be viewed in its entirety in window 204. The text of the email 212 in window 204 confirms what was indicated by the judgment score of email 212—that the email 212 does not involve subject matter of objectively great urgency or importance.

FIG. 2 also shows that within window 204, the user of window 200 is presented with a dialog box 206 for rating the judgment of the sender of email 212, identified as "Jack Mathers," when defining the urgency indicator of the email 212 as "urgent." Dialog box 206 asks the user how he or she would rate Mr. Mather's use of the "urgent" indicator in email 212. The user is presented with a group of radio buttons 208 within dialog box 206 for indicating the user's opinion as to the judgment of "Jack Mathers" when defining the urgency indicator of the email 212 as "urgent." FIG. 2 shows that the radio button identified as "very bad" has been selected.

Using information entered by the user in dialog box 206, the judgment score associated with the sender "Jack Mathers" may be modified as described in greater detail below. It should be noted that although FIG. 2 shows the use of a dialog box 206 with radio buttons 208 within window 204 of email application 200, the present invention supports other methods of garnering ratings from the user, such as pull down menus, text fields, combo boxes, other graphical interface elements such as dials and slider bars and voice input. Further, ratings may take other forms, such as percentage numerical indicators.

Of note, the processed described in connection with FIG. 2 is not limited strictly to messages received that have had an urgency indicator applied thereto. Rather, recognizing that senders oftentimes undervalue the importance of a message by not applying an urgent enough indication or any urgency indicator at all, the process can permit the recipient of a message to apply a rating demonstrating an underrating of a received message. As an example, when an urgent message is received that has an under-usage of the urgency indicator including providing no indication of urgency, a rating can be applied by the recipient to so indicate the sender having underrated the urgent message.

Figure 3:
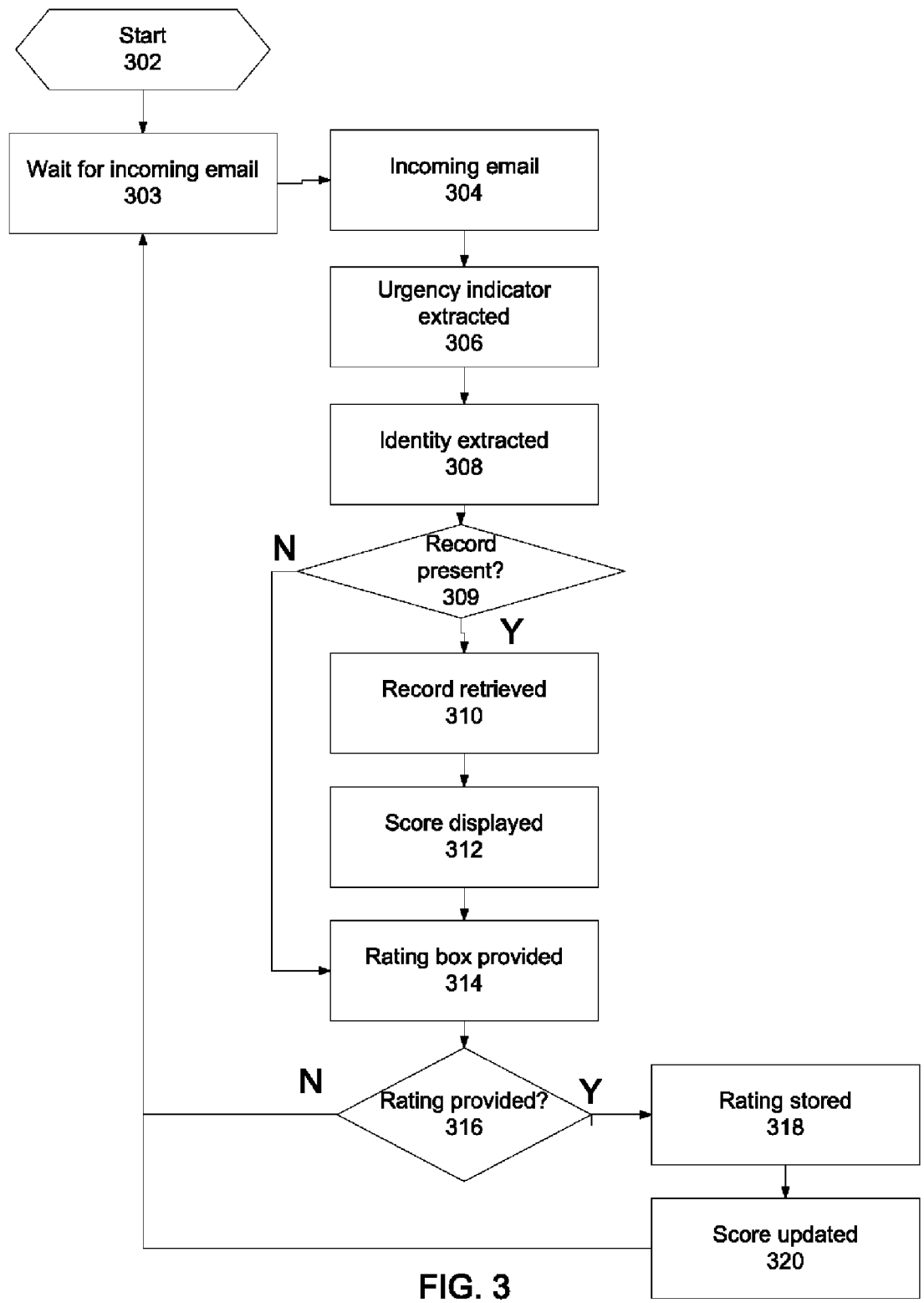
FIG. 3 is a flowchart showing the control flow of a process for managing urgency indicators of electronic messages, according to an embodiment of the present invention.

For exemplary purposes, FIG. 3 will focus on a system for managing urgency indicators of email electronic messages. FIG. 3 is a flowchart showing the control flow of a process for managing urgency indicators of electronic messages, according to an embodiment of the present invention. FIG. 3 summarizes the process facilitated by program logic 150 of FIG. 1. The control flow of FIG. 3 begins with step 302 and flows to step 304. In step 304, an incoming email from email sender 112 is sent via computer 114 and received by the computer 104 of recipient user 102. The email from sender 112 includes an urgency indicator set to an "urgent" status.

In step 306 the urgency indicator within the email from sender 112 is extracted. The urgency indicator may be any value within a given range, such as the range from "Normal" to "Urgent" or the range from "1" to "10." In step 308, the program logic 150 extracts the identity of the sender 112. The identity of the sender 112 may be defined as the email address or the name of the sender 112. In step 309, the program logic 150 seeks a record in database 108 associated with the identity of the sender 112. If a record is found, control flows to step 310. If no record is found, control flows to step 314.

In step 310, the program logic 150 retrieves a record in database 108 associated with the identity of the sender 112. The record in database 108 includes a judgment score. A judgment score is a value that indicates the historical veracity or authenticity of the urgent status of a sender's emails, based on ratings previously given to the sender of the emails.

The ratings in the record may be limited to ratings previously provided by the user 102 and established for a particular sender 112. Alternatively, the ratings in the record may be limited to ratings established by certain other users, such as only users from the same social network, the same working group, or the same department. Alternatively, the ratings in the record may be limited to ratings established by groups derived from a directory such as an LDAP directory. Alternatively the ratings may be established based on groups of users and selected e-mails based on subject, presence of key words, included subject determined by an analysis program, rules or policies combining the aforementioned elements or the like. Further the judgment score may be stored in the data base or derived from records prior to display or at some other time.

In another embodiment of step 310, the program logic 150 seeks and retrieves a record in database 108 associated with the identity of the sender 112, wherein the record is further associated with a group of senders. The record may pertain to certain other users, such as only users from the same social network, the same working group, or the same department. Alternatively, the record may pertain to groups derived from a directory such as an LDAP directory. Alternatively the ratings may be based on groups of users and selected e-mails based on subject, presence of key words, included subject determined by an analysis program, rules or policies combining the aforementioned elements or the like. In this embodiment, the judgment score in the record is an aggregate or cumulative score that represents the judgment scores of members of the group.

In step 312, the program logic 150 displays the judgment score of the sender 112 or group to which sender 112 belongs, as retrieved or derived from the corresponding record or records, along side or in conjunction with the received email. The judgment score may be displayed via a visual display, may be spoken via spoken words through text to speech functionality or may be conveyed via other means by which an e-mail device may communicate with a user. Thus, the user 102 is able to view or experience the "urgent" status of the email in conjunction with the judgment score for the sender 112. Note the judgment score displayed or conveyed alongside an email pertains to any urgency indicator value provided by sender 112. Displaying or conveying the email may comprise displaying a subject line of the email, a summary of the email, key words associated with an email, other information associated with the email or any combination of the aforementioned elements.

In one alternative to step 312, the program logic 150 may modify the "urgent" status of the email according to the judgment score retrieved from the corresponding record. Thus, if the judgment score is low, the "urgent" status may be lowered or eliminated.

Next, in step 314, the user 102 is provided with a dialog box, such as dialog box 206, for indicating an opinion or rating as to the judgment of sender 112 when defining the urgency indicator of the email as "urgent." In step 316 it is determined whether the user 102 enters a rating in dialog box 206. If so, then control flows to step 318. If not, control flows to step 303 where the system waits for the reception of email.

In step 318, the rating is stored in the record in database 108 associated with the identity of the sender 112. If no record was previously found in database 108 for the sender 112, then in step 318, a record is created before the rating is stored. In step 320, the judgment score in the record in database 108 associated with the identity of the sender 112 is updated. Alternatively, the judgment score based on the database 108 may be generated prior to display in step 312, or at some other time.

The judgment score may be updated in a variety of ways. One approach is to average the ratings provided by the user 102. Another approach is to take various factors into account and produce a weighted average wherein more recent ratings are weighted higher.

In one embodiment of the present invention, the user 102 may request a report on a sender of electronic communications, such as user 112. In this embodiment, the user 102 may utilize a user interface, such as user interface 200, to request a report. In response, the program logic 150 may then access the record in the database 108 corresponding to user 112. The program logic 150 may then display the contents of the record (or a summary or other metadata of the information in the record) to the user 102. The record includes, among other things, ratings corresponding to the perceived value of urgency indicators previously set by the user 112.

In one embodiment of the present invention, the program logic 150 includes a configuration option which may enable the urgency indicator management process only for certain urgency indicator settings. For example, the user 102 may desire to enable the urgency indicator management process only for urgency indicators set to "Urgent" but not to "Normal."

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

We claim:

1. A method for managing urgency indicators in electronic messages, comprising:
    displaying a judgment score for an urgency indicator used by a sender of an electronic message, the judgment score being associated with the sender to indicate historical veracity or authenticity of the sender's use of urgency indicators;
    receiving a rating from a recipient of the electronic message, the rating indicating the recipient's opinion as to veracity or authenticity of the sender's use of the urgency indicator in the electronic message; and,
    modifying the judgment score associated with the sender based on the received rating from the recipient.

2. The method of claim 1,
    wherein the judgment score is formed from multiple different ratings in connection with the sender of respectively different electronic messages and a corresponding use of an urgency indicator for each of the different electronic messages;
the method further comprising:
    receiving a further electronic message from the sender; and
    modifying the judgment score associated with the sender based on a rating from a recipient of the further electronic message.

3. The method of claim 1, further comprising
    generating and displaying a report of at least one sender of an electronic message and at least one corresponding rating of the sender and the use by the sender of urgency indicators.

4. The method of claim 1, wherein
    the rating is based upon an under-usage of the urgency indicator for the electronic message.

5. A computer program product comprising a computer-readable storage memory having stored therein computer usable program code for managing urgency indicators in electronic messages, the computer usable code, which when executed by a computer hardware system, causes the computer hardware system to perform
    displaying a judgment score for an urgency indicator used by a sender of an electronic message, the judgment score being associated with the sender to indicate historical veracity or authenticity of the sender's use of urgency indicators;
    receiving a rating from a recipient of the electronic message, the rating indicating the recipient's opinion as to veracity or authenticity of the sender's use of the urgency indicator in the electronic message; and,
    modifying the judgment score associated with the sender based on the received rating from the recipient.

6. The computer program product of claim 5, wherein the judgment score is formed from multiple different ratings in connection with the sender of respectively different electronic messages and a corresponding use of an urgency indicator for each of the different electronic messages;
the computer hardware system is further caused to perform
    receiving a further electronic message from the sender; and
    modifying the judgment score associated with the sender based on a rating from a recipient of the further electronic message.

7. The computer program product of claim 5, wherein the computer hardware system is further caused to perform
    generating and displaying a report of at least one sender of an electronic message and at least one corresponding rating of the sender and the use by the sender of urgency indicators.

8. The computer program product of claim 5, wherein
    the rating is based upon an under-usage of the urgency indicator for the electronic message.

9. A data processing system configured to manage urgency indicators in electronic messages, the system comprising:
    a processor configured to perform
        displaying a judgment score for an urgency indicator used by a sender of an electronic message, the judgment score being associated with the sender to indicate historical veracity or authenticity of the sender's use of urgency indicators;
        receiving a rating from a recipient of the electronic message, the rating indicating the recipient's opinion as to veracity or authenticity of the sender's use of the urgency indicator in the electronic message; and,
        modifying the judgment score associated with the sender based on the received rating from the recipient.

10. The system of claim 9, wherein the judgment score is formed from multiple different ratings in connection with the sender of respectively different electronic messages and a corresponding use of an urgency indicator for each of the different electronic messages.

11. The system of claim 9, further comprising a database that stores a plurality of judgment values, each of the judgment values representing a historical veracity or authenticity of urgency indicators previously established for electronic messages by corresponding senders.

* * * * *